United States Patent
Damgaard et al.

(10) Patent No.: US 12,173,690 B2
(45) Date of Patent: Dec. 24, 2024

(54) WIND TURBINE

(71) Applicant: Siemens Gamesa Renewable Energy A/S, Brande (DK)

(72) Inventors: Steen Damgaard, Herning (DK); Samuel H. Hawkins, Vejle (DK); Rune Nielsen, Ikast (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 143 days.

(21) Appl. No.: 17/440,320

(22) PCT Filed: Mar. 9, 2020

(86) PCT No.: PCT/EP2020/056201
§ 371 (c)(1),
(2) Date: Sep. 17, 2021

(87) PCT Pub. No.: WO2020/193113
PCT Pub. Date: Oct. 1, 2020

(65) Prior Publication Data
US 2022/0186710 A1     Jun. 16, 2022

(30) Foreign Application Priority Data
Mar. 22, 2019  (EP) .................................. 19164710

(51) Int. Cl.
 *F03D 7/02*  (2006.01)
(52) U.S. Cl.
 CPC .......... *F03D 7/0244* (2013.01); *F03D 7/0208* (2013.01); *F05B 2260/90* (2013.01); *F05B 2270/32* (2013.01); *F05B 2270/321* (2013.01)
(58) Field of Classification Search
 CPC ...... F03D 7/0244; F03D 7/0208; F03D 80/00; F03D 7/0268; F05B 2260/90; F05B 2270/32; F05B 2270/321
 See application file for complete search history.

(56) References Cited

U.S. PATENT DOCUMENTS

| | | | |
|---|---|---|---|
| 8,899,920 B2 | 12/2014 | Andersen | |
| 2004/0253093 A1* | 12/2004 | Shibata | F03D 9/25 415/4.1 |

(Continued)

FOREIGN PATENT DOCUMENTS

| | | |
|---|---|---|
| CN | 1549897 A | 11/2004 |
| CN | 102312780 A | 1/2012 |

(Continued)

OTHER PUBLICATIONS

English Translation of CN-106677983-A (Year: 2017).*
PCT International Search Report and Written Opinion of International Searching Authority mailed Jun. 9, 2020 corresponding to PCT International Application No. PCT/EP2020/056201 filed Mar. 9, 2020.

*Primary Examiner* — Brian Christopher Delrue
(74) *Attorney, Agent, or Firm* — Schmeiser, Olsen & Watts LLP

(57) ABSTRACT

Provided is a wind turbine including an active yaw system realized to maintain an upwind orientation of the wind turbine aerodynamic rotor during safe operating conditions, which active yaw system includes a number of yaw drive units, and wherein a yaw drive unit includes a negative brake; a principal power supply configured to supply power to the active yaw system during normal operation of the wind turbine; and a dedicated negative brake reserve power supply configured to supply power to the negative brakes in the event of a grid disconnect. A method of operating such a wind turbine is also provided.

14 Claims, 5 Drawing Sheets

(56) References Cited

U.S. PATENT DOCUMENTS

| | | | |
|---|---|---|---|
| 2006/0001268 A1* | 1/2006 | Moroz | F03D 7/0272 |
| | | | 290/44 |
| 2008/0084068 A1 | 4/2008 | Shibata et al. | |
| 2009/0243295 A1* | 10/2009 | Kammer | F03D 7/043 |
| | | | 290/44 |
| 2010/0314875 A1* | 12/2010 | Grant | F03D 7/0272 |
| | | | 290/44 |
| 2011/0211961 A1* | 9/2011 | Nies | F03D 80/00 |
| | | | 416/169 R |
| 2012/0282093 A1 | 11/2012 | Rebsdorf et al. | |
| 2013/0259686 A1* | 10/2013 | Blom | F03D 7/0276 |
| | | | 416/61 |
| 2014/0145439 A1* | 5/2014 | Burra | F03D 7/0204 |
| | | | 290/44 |
| 2014/0241879 A1 | 8/2014 | Fahrner | |
| 2014/0363289 A1* | 12/2014 | Hagedorn | F03D 7/0224 |
| | | | 416/169 R |
| 2015/0369213 A1* | 12/2015 | Jakobsson | F03D 15/00 |
| | | | 416/153 |

FOREIGN PATENT DOCUMENTS

| | | | |
|---|---|---|---|
| CN | 106677983 A | * | 5/2017 |
| CN | 108266316 A | | 7/2018 |
| CN | 106677983 B | | 2/2019 |
| EP | 1429025 A1 | | 6/2004 |
| EP | 2738382 A2 | | 6/2014 |
| JP | 2005320891 A | | 11/2005 |
| JP | 2007146858 A | | 6/2007 |
| JP | 2013181499 A | | 9/2013 |
| JP | 2016505119 A | | 2/2016 |

* cited by examiner

WIND TURBINE

CROSS-REFERENCE TO RELATED APPLICATIONS

This application claims priority to PCT Application No. PCT/EP2020/056201, having a filing date of Mar. 9, 2020, which is based off of EP Application No.19164710.6, having a filing date of Mar. 22, 2019, the entire contents both of which are hereby incorporated by reference.

FIELD OF TECHNOLOGY

The following relates to a wind turbine and a method of operating a wind turbine.

BACKGROUND

During strong wind conditions such as a hurricane, cyclone, typhoon etc., a wind turbine will typically be out of operation and in an idling mode. The loading from the wind on the support structure (tower, foundation, and substructure) and on the rotor blades depends to a large extent on the orientation of the aerodynamic rotor relative to the wind direction.

Most horizontal-axis wind turbines are designed for "upwind orientation", i.e. the aerodynamic rotor (hub and rotor blades) is directed into the wind during normal operation. To reduce wind loading when the wind turbine is shut down to ride out a high wind event, the aerodynamic rotor can either be held in the upwind orientation, or turned by 180° into the opposite downwind orientation.

If the aerodynamic rotor of a wind turbine is in the upwind orientation during extreme wind conditions, even very small changes in the wind direction can result in large forces acting on the aerodynamic rotor, and may rapidly force the aerodynamic rotor (and nacelle) even further out of alignment with the wind. In very strong winds, the wind turbine's yaw system may not be able to correct this misalignment to move the aerodynamic rotor back into the upwind position. When the aerodynamic rotor is no longer in a correct upwind orientation, the forces on the wind turbine's support structure and other components can increase significantly. If the wind turbine is not designed to withstand such extreme loading, damage may occur to the support structure, and may even lead to catastrophic failure.

For these reasons, if the turbine's yaw system is not able to correct the rotor misalignment, it is preferred to allow the wind turbine to slip about its yaw axis during such adverse weather conditions, and to turn the aerodynamic rotor into the downwind position. The downwind position has the advantage that any small deviation between the downwind orientation of the aerodynamic rotor and the wind direction results in the wind passively pushing the aerodynamic rotor back towards the optimal downwind alignment.

A wind turbine may implement an active yawing system, i.e. a set of yaw motors that are powered by electricity to turn the nacelle and aerodynamic rotor into the desired orientation. The active yaw system may be used to turn the aerodynamic rotor into the downwind orientation during unfavourable wind conditions. However, grid outages may occur during severe storm conditions, and such an active yaw system may therefore be left without power, unable to make any necessary alignment adjustments.

An active yaw system may implement negative brakes. In a negative brake arrangement, the default state is "closed", and an external force is required to release or "open" the brakes. The external force may be supplied by hydraulic pressure, an electromagnet, etc. It is usual in the prior art "upwind-orientation" wind turbines to use negative brakes to assist in maintaining the desired upwind orientation during normal operation of the wind turbine. The use of negative brakes ensures that if an absence of grid power or other type of power failure to the active yaw system occurs during operation, the yaw brakes will engage and prevent a potentially hazardous rapid misalignment of the operating aerodynamic rotor.

Adverse weather conditions may be accompanied by an absence of grid power. Even in these cases, it is desirable to maintain either an upwind or downwind orientation in order to minimize loading. For this reason, it is known from the prior art to provide a reserve power supply with the capacity to fully power the active yaw system (i.e. yaw drive motors and controllers) as well as the negative brakes.

Such a reserve power supply must provide a very large energy reserve to ensure safe functioning of the active yaw system and the negative brakes during an extended grid power outage, and therefore also adds significantly to the overall cost of the wind turbine. Such complex systems are also prone to failure, decreasing the likelihood of availability when needed.

SUMMARY

An aspect relates to provide a more reliable way of protecting a wind turbine from damage during severe wind conditions.

The inventive wind turbine comprises an active yaw system realized to maintain an upwind orientation of the wind turbine aerodynamic rotor during safe operating conditions, which active yaw system comprises a number of yaw drive units, and wherein a yaw drive unit comprises a negative brake; a principal power supply configured to supply power to the active yaw system during normal operation of the wind turbine; and a dedicated negative brake reserve power supply configured to supply power to the negative brakes in the event of a grid disconnect.

In the context of embodiments of the invention, the term "dedicated negative brake reserve power supply" is to be understood as a reserve power supply whose purpose is exclusively to supply power to the negative brakes of the active yaw system. The advantage of the inventive wind turbine is that the large-capacity active yaw system reserve power supply is not needed. Also in the context of embodiments of the invention, the term "principal power supply" is to be understood as a primary or main power supply originating from the generator or from the grid. As long as the wind turbine is operating, i.e. generating output power, this main power supply is available to provide power to the active yaw system to drive the yaw motors and also to power the negative brakes.

An advantage of the inventive wind turbine is that, during a grid disconnect, the dedicated negative brake reserve power supply is able to keep the negative brakes open so that the aerodynamic rotor is passively turned out of the wind. This means that the wind itself will turn the aerodynamic rotor into the downwind orientation without the need for any active yawing.

According to embodiments of the invention, the method of operating such a wind turbine comprises the steps of driving the active yaw system from the principal power supply to maintain an upwind orientation of the wind turbine aerodynamic rotor during safe operating conditions; and actuating the negative brakes (i.e. releasing the braking torque) using the dedicated negative brake reserve power supply in the event of a grid disconnect to permit passive turning of the aerodynamic rotor into a downwind orientation.

In the following, it may be assumed that the wind turbine is a horizontal-axis upwind-facing wind turbine, i.e. a wind turbine that can continually adjust its yaw angle so that the aerodynamic rotor always faces directly into the wind. It is important to minimize the yaw error (discrepancy between wind direction and axis of the aerodynamic rotor) so that the generator can extract as much energy as possible from the wind. An active yaw system of a wind turbine may be assumed to comprise several yaw drive units, for example six such units. Each yaw drive unit may be understood to comprise a pinion that engages with a toothed yaw ring, and a motor unit (with gearbox) to turn the pinion. The negative brake of a yaw drive unit serves to prevent unwanted rotation of the pinion, i.e. to keep the pinion motionless but engaged with the yaw ring. Rotation of the pinion (and yawing of the wind turbine) is only possible when the negative brake is released or opened.

The wind turbine also comprises a reserve power supply controller that is configured to regulate the supply of power to the negative brakes, i.e. to connect/disconnect the power supply to the negative brakes as required. This controller is powered by the dedicated negative brake reserve power supply, so that it can operate correctly even in the event of a grid disconnect.

Once the aerodynamic rotor has been brought into the downwind orientation, it should maintain this position until it is safe to turn it back into the upwind orientation. Since the wind direction may change, it is necessary to correct the orientation of the aerodynamic rotor. By keeping the negative brakes open, the aerodynamic rotor can always be passively moved by the wind to the downwind orientation. However, the wind direction may remain essentially constant during an extended interval. Therefore, in a preferred embodiment of the invention, the controller of the dedicated negative brake reserve power supply is configured to regulate power to the negative brakes on the basis of the relative wind direction, to remove power from the negative brakes during a constant wind direction interval. The relative wind direction can be established in the usual manner, using a wind direction sensor mounted at a suitable location on the exterior of the wind turbine. A constant wind direction interval may be deemed to be an interval of a certain minimum duration during which the wind direction remains essentially constant, for example a wind direction that does not change more than ±8° averaged over at least 30 seconds. During such an interval, it is considered safe to hold the aerodynamic rotor at a fixed position even if the wind direction may change. As soon as the monitored wind direction leaves this range, the controller of the dedicated negative brake reserve power supply is configured to apply power to the negative brakes to release them, so that the aerodynamic rotor can passively correct its downwind orientation.

As mentioned above, excessive wind loading must be avoided to prevent damage to structural components of the wind turbine. At low wind speeds, for example wind speeds up to 4 or 5 on the Beaufort scale, wind loading is generally not critical for idling or stopped wind turbines. It is, therefore, not necessary to maintain the downwind orientation of the aerodynamic rotor while disconnected from the grid in these conditions. Therefore, in a further preferred embodiment of the invention, the controller of the dedicated negative brake reserve power supply is configured to regulate power to the negative brakes on the basis of the wind speed, to remove power from the negative brakes during a low wind speed interval. A low wind speed interval may be assumed if the average wind speed, observed over a certain duration, is less than a minimum wind speed threshold. For example, a low wind speed interval may be assumed if the average wind speed over 30 seconds is less than 15 m/s. The wind speed can be established in the usual manner, using a wind speed sensor mounted at a suitable location on the exterior of the wind turbine. Power is removed from the brakes (thereby locking them) once a low wind speed interval has commenced. Power is re-applied to the brakes when the wind speed increases above the minimum wind speed threshold.

Below such a minimum wind speed threshold, it is considered safe to hold the aerodynamic rotor at a fixed position even if the wind direction varies significantly. As soon as the monitored wind speed increases beyond this minimum wind speed threshold, the controller of the dedicated negative brake reserve power supply is configured to apply power to the negative brakes to release them, so that the aerodynamic rotor can passively correct its downwind orientation.

The wind direction sensor and wind speed sensor may be separate components or realised as a single component. To obtain a wind direction reading and a wind speed reading, such a sensor generally includes an evaluation module and a means of connecting it to a power supply. As indicated above, it is advisable to turn the aerodynamic rotor to a downwind orientation in the absence of grid power. Any sensor that is powered only by a primary power supply will not be able to provide readings during the grid disconnect interval. Therefore, in a further preferred embodiment of the invention, the dedicated negative brake reserve power supply is configured to also supply power to the wind direction sensor and/or to the wind speed sensor. Since these components generally do not dissipate much power, the dedicated negative brake reserve power supply can comfortably also supply power to them in the even of a grid disconnect.

The dedicated negative brake reserve power supply can be realized as any suitable module, for example to use a battery, a fuel cell, a small diesel generator, etc. The dedicated negative brake reserve power supply is configured as a redundant system, for example to include two batteries so that one can take over if the other fails.

The dedicated negative brake reserve power supply is realized to supply power to the negative brakes for a duration of at least six hours, more preferably at least eight hours.

The wind turbine may be designed to have a dedicated reserve power supply whose sole purpose is to provide power to the negative brakes whenever these cannot be powered by the primary power supply. Alternatively, the reserve power supply may also be used to provide power to components such as dehumidifiers, navigation and aviation lighting, satellite communication equipment, etc. in the event of a grid disconnect. However, supplying power to these components may cause the reserve power level to deplete before normal operation of the wind turbine can resume. Therefore, in a particularly preferred embodiment of the invention, the wind turbine also comprises a monitoring arrangement realized to monitor the available reserve power and to restrict reserve power only to the negative brakes when the available reserve power reaches a predefined threshold level. As a fail-safe measure, the wind turbine may comprise an additional independent monitoring arrangement for the reserve power supply.

BRIEF DESCRIPTION

Some of the embodiments will be described in detail, with reference to the following figures, wherein like designations denote like members, wherein.

Figure 1:
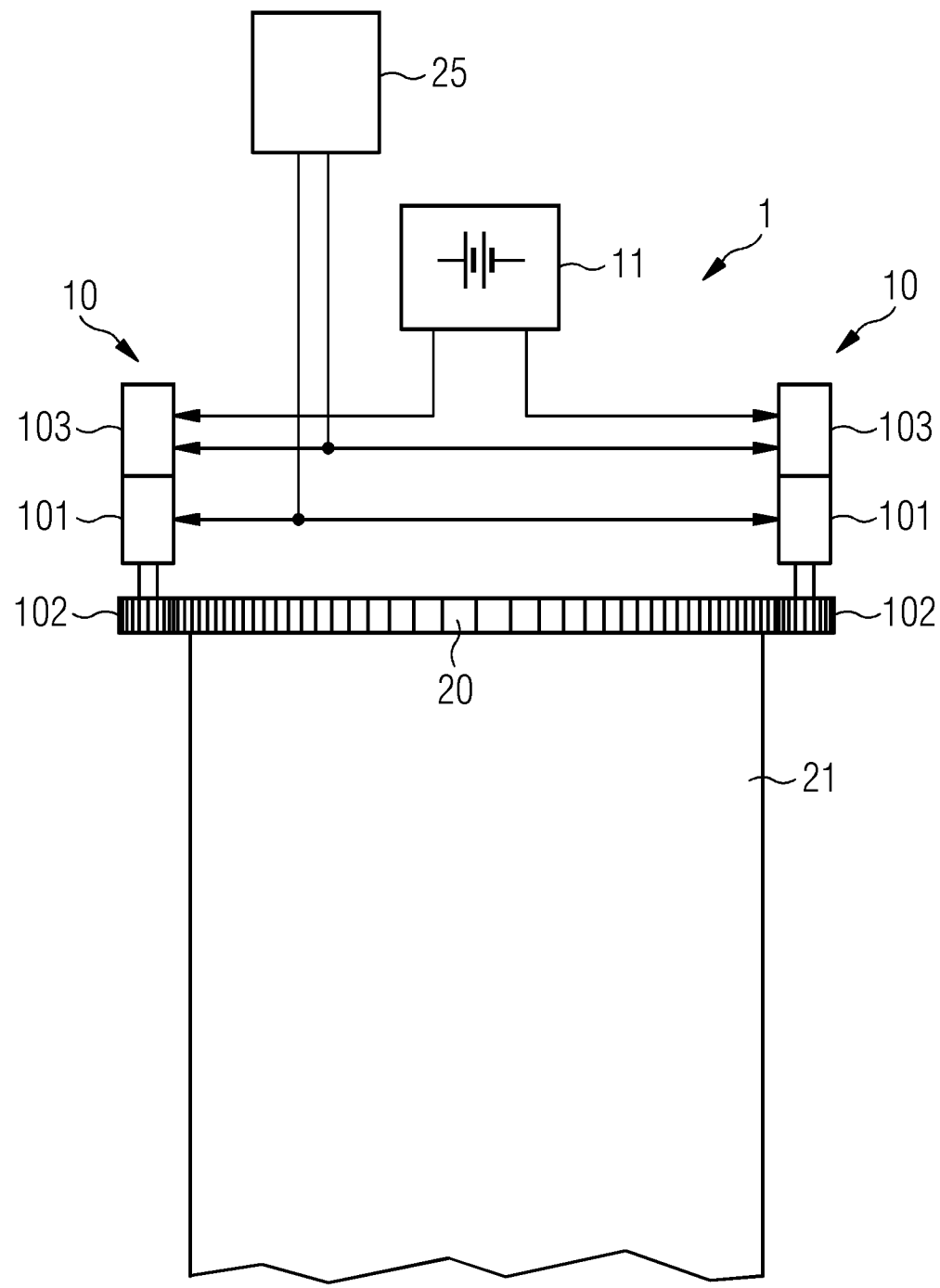
FIG. 1 shows a yaw system in an embodiment of the wind turbine.

FIG. 1 shows a yaw system 1 in an embodiment of the inventive wind turbine. The diagram shows a yaw ring 20 at the top of a wind turbine tower 21. Other wind turbine components such as the nacelle, generator, aerodynamic rotor etc. may be assumed to be present but are not shown for the sake of clarity. In the diagram, only two yaw drive units 10 are indicated but it shall be understood that the yaw system 1 may comprise six or more yaw drive units 10 arranged to turn the nacelle relative to the wind turbine tower 21. Each yaw drive unit 10 comprises a motor unit 101 configured to turn a toothed pinion 102, which engages with the toothed yaw ring 20. The yaw drive units 10 are usually all operated in a synchronous manner to collectively turn the nacelle to align the aerodynamic rotor as desired. The motor units 101 are powered from the grid (indicated as a primary power supply 25) during normal operation of the wind turbine, i.e. as long as the wind turbine is connected to the grid. To hold a desired alignment, each yaw drive unit 10 comprises a negative brake 103 which, when closed, prevents rotation of the pinion 102. To release or open the negative brake 103, it is necessary to provide power to the negative brake 103. During normal operation of the wind turbine, the negative brakes 103 are also powered from the grid or primary power supply 25. In the event of a grid disconnect, the negative brakes 103 are provided with power by a dedicated negative brake reserve power supply 11. The capacity of the dedicated negative brake reserve power supply 11 need only be enough to provide power to the negative brakes 103 for a certain minimum length of time, for example up to six hours.

Figure 2:
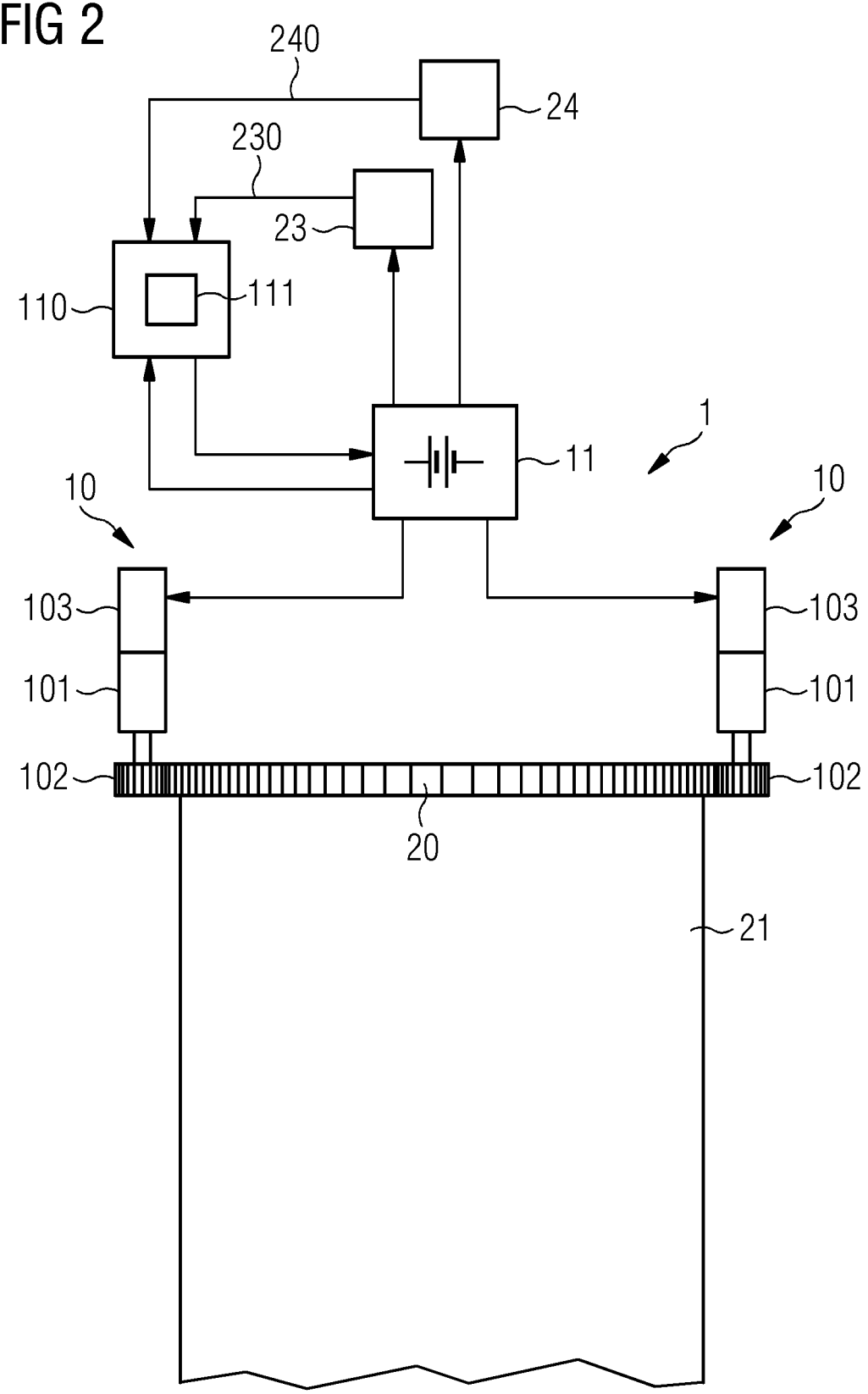
FIG. 2 shows a yaw system in a further embodiment of the inventive wind turbine.

FIG. 2 shows a yaw system in a further embodiment of the inventive wind turbine. For clarity, the principal power supply 25 explained in FIG. 1 is left out. Here, the dedicated negative brake reserve power supply 11 is managed by a controller 110 which is realised to switch the power supply 11 on or off. Embodiments of the invention are based on the insight that, when the aerodynamic rotor is in the downwind position, it may be safe to remove power from the brakes under certain conditions. For example, if the wind is relatively steady and/or the wind speed is relatively low, it may be safe to close the brakes 103 and thereby save power. To this end, the controller 110 receives a wind speed signal 240 from a wind speed sensor 24, and a wind direction signal 230 from a wind direction sensor 23. The controller 110 evaluates the wind speed signal 240 to determine whether the wind speed is sufficiently low, i.e. whether the wind conditions qualify as a low wind speed interval. Similarly, the controller 110 evaluates the wind direction signal 230 to determine whether the wind direction is remaining essentially constant or at least steady within an acceptable range. If both conditions apply, the controller 110 may switch off the power supply 11 so that the negative brakes 103 are closed. The aerodynamic rotor will now hold its position. The controller 110 continues to monitor the wind speed signal 240 and the wind direction signal 230. As soon as the wind direction signal 230 changes by a minimum or predefined amount, the controller 110 switches the power supply 11 on again to open the brakes. The changed wind direction results in the aerodynamic rotor 22 being passively moved to return to the more optimal downwind position. With the controller 110 and the wind sensors 23, 24 it is possible to save power whenever conditions permit the brakes 103 to be closed. This allows the dedicated negative brake reserve power supply 11 to have a relatively low capacity (associated with lower cost) and/or to provide reserve power for a favourably long duration. The diagram also indicates an optional monitoring arrangement 111 that can monitor the available reserve power. When the available reserve power reaches a low level, the controller 110 may restrict reserve power to the negative brakes 103.

The dedicated negative brake reserve power supply 11 can comprise two batteries, so that one battery can take over if the other fails. As an additional fail-safe measure, the wind turbine may comprise an additional monitoring arrangement for the reserve power supply 11. For example, the monitoring arrangement 111 of the controller 110 may be duplicated.

Figure 3:
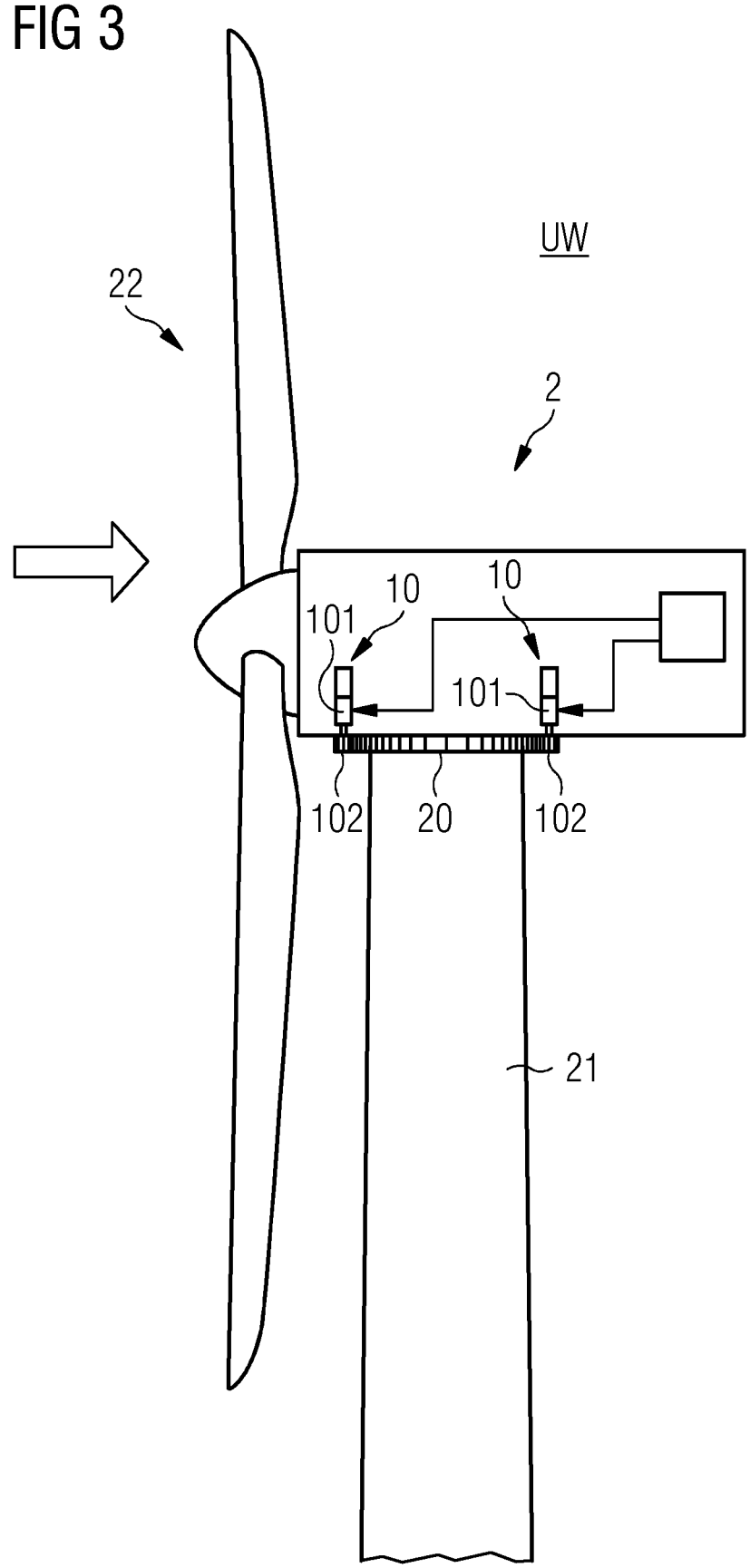
FIG. 3 shows the inventive wind turbine in an upwind orientation.

FIG. 3 shows an embodiment of the inventive wind turbine 2 in an upwind orientation UW. The diagram shows the aerodynamic rotor 22 facing into the wind. The yaw drive units 10 receive power from the grid during normal operation of the wind turbine 2.

Figure 4:
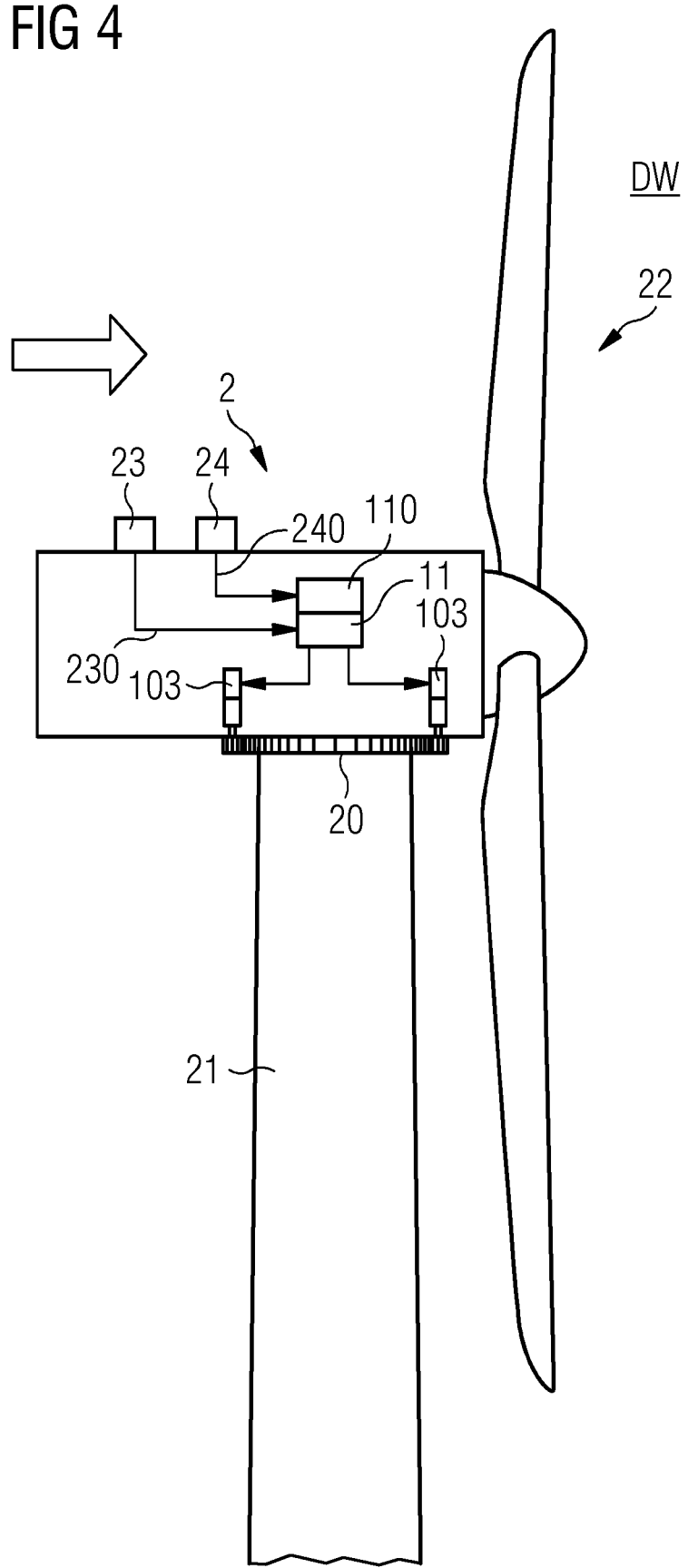
FIG. 4 shows the inventive wind turbine in a downwind orientation.

FIG. 4 shows the wind turbine 2 of FIG. 3 in a downwind orientation DW. This position is assumed whenever the wind conditions are unsafe (e.g. during a storm, hurricane etc.) or whenever the wind turbine is disconnected from the grid. The diagram shows the aerodynamic rotor 22 facing out of the wind. The negative brakes 103 of the yaw drive units 10 receive power from the dedicated negative brake reserve power supply 11. The controller 110 of the dedicated negative brake reserve power supply 11 can conserve power by evaluating wind speed and wind direction signals 230, 240 provided by a wind direction sensor 23 and a wind speed sensor 24 as described in FIG. 2.

Figure 5:
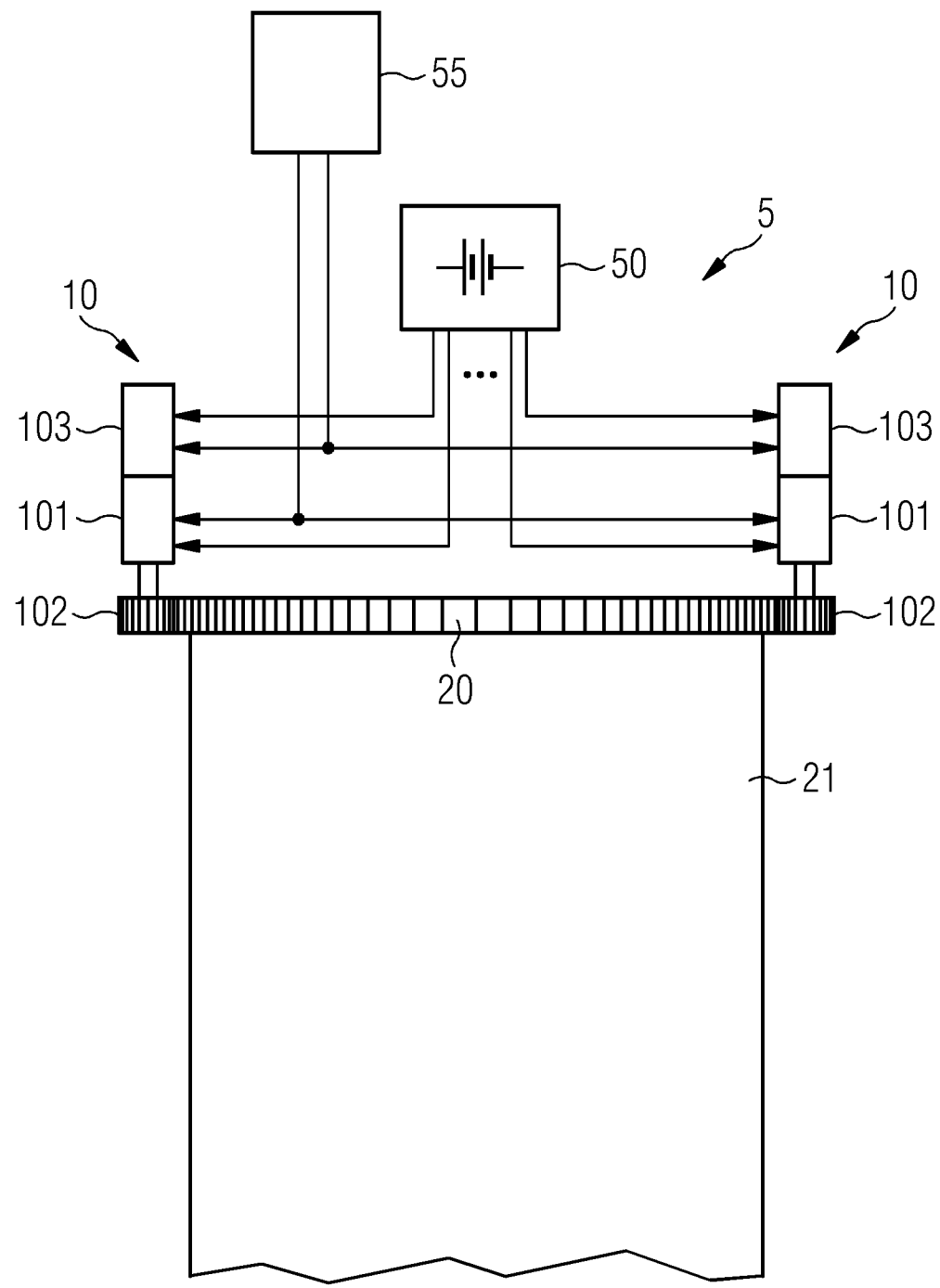
FIG. 5 shows a conventional yaw system in a wind turbine.

FIG. 5 shows a yaw system 5 in a prior art wind turbine. Here also, each yaw drive unit 10 comprises a motor unit 101 configured to turn a toothed pinion 102, which engages with a toothed yaw ring 20. To hold a desired alignment, each yaw drive unit 10 comprises a negative brake 103 which, when closed, prevents rotation of the pinion 102. Here also, the motor units 101 and negative brakes 103 are powered from the grid (indicated as a principal power supply 55) during normal operation of the wind turbine. To ensure safe operation of the prior art wind turbine, the yaw system 5 includes a reserve power supply 50 that has sufficient capacity to power the drive units 101 and also the negative brakes 103. Because the capacity of the reserve power supply 50 must be large enough to power these units during a grid outage, the cost of the reserve power supply 50 is correspondingly high. Furthermore, the level of complexity is such that the likelihood of failure is also quite high.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A wind turbine comprising:
   an active yaw system configured to maintain an upwind orientation of a wind turbine aerodynamic rotor during normal operating conditions, the active yaw system comprising a plurality of yaw drive units, wherein a yaw drive unit comprises a negative brake releasing a brake when power is provided;
   a principal power supply configured to supply power to the active yaw system during normal operation of the wind turbine; and
   a dedicated negative brake reserve power supply configured to supply power to the negative brake in an event of a grid disconnect, wherein, when the wind turbine is disconnected from the grid, a reserve power supply controller disconnects power to the negative brake during at least one of: intervals when a wind direction change is within a predetermined range and/or when a wind speed is less than or equal to a predetermined magnitude.

2. The wind turbine according to claim 1, wherein the reserve power supply controller is configured to regulate the supply of power from the dedicated negative brake reserve power supply to the negative brake.

3. The wind turbine according to claim 2, wherein the dedicated negative brake reserve power supply is configured to supply power to the reserve power supply controller.

4. The wind turbine according to claim 1, comprising a wind direction sensor configured to determine the wind direction, and wherein the reserve power supply controller is configured to regulate power to the negative brake on a basis of the wind direction.

5. The wind turbine according to claim 4, wherein the reserve power supply controller is configured to remove power from the negative brake during a constant wind direction interval.

6. The wind turbine according to claim 1, comprising a wind speed sensor configured to determine the wind speed, and wherein the reserve power supply controller is configured to regulate power to the negative brake on a basis of the wind speed.

7. The wind turbine according to claim 6, wherein the reserve power supply controller is configured to remove power from the negative brake during a low wind speed interval.

8. The wind turbine according to claim 4, wherein the dedicated negative brake reserve power supply is configured to also supply power to the wind direction sensor and/or to a wind speed sensor.

9. The wind turbine according to claim 1, wherein the dedicated negative brake reserve power supply is any of a battery, a fuel cell, a diesel generator.

10. The wind turbine according to claim 1, wherein the dedicated negative brake reserve power supply is configured to supply power to the negative brake for a duration of at least six hours.

11. The wind turbine according to claim 1, wherein an available reserve power is monitored to restrict reserve power to the negative brake when the reserve power decreases to a predefined threshold level.

12. The wind turbine according to claim 1, comprising a redundant dedicated negative brake reserve power supply.

13. A method of operating the wind turbine according to claim 1, the method comprising:
    driving the active yaw system from the principal power supply to maintain the upwind orientation of the wind turbine aerodynamic rotor during safe operating conditions; and
    actuating negative brakes from the dedicated negative brake reserve power supply in the event of the grid disconnect to permit passive turning of the aerodynamic rotor into a downwind orientation.

14. The method according to claim 13, comprising a step of removing power from the negative brakes while the aerodynamic rotor is in the downwind orientation.

* * * * *